(12) United States Patent
Pierre et al.

(10) Patent No.: US 9,432,745 B2
(45) Date of Patent: *Aug. 30, 2016

(54) PLAYBACK OF INTERACTIVE PROGRAMS

(71) Applicant: OpenTV, Inc., San Francisco, CA (US)

(72) Inventors: Ludovic Pierre, Paris (FR); Vincent Dureau, Palo Alto, CA (US); Alain Delpuch, Paris (FR)

(73) Assignee: OpenTV, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,907

(22) Filed: Dec. 8, 2014

(65) Prior Publication Data

US 2015/0095967 A1    Apr. 2, 2015

Related U.S. Application Data

(63) Continuation of application No. 12/115,598, filed on May 6, 2008, now Pat. No. 8,909,027, which is a continuation of application No. 11/205,238, filed on Aug. 16, 2005, now Pat. No. 7,386,221, which is a
(Continued)

(51) Int. Cl.
*H04N 5/92*    (2006.01)
*H04N 21/81*    (2011.01)
(Continued)

(52) U.S. Cl.
CPC ............ *H04N 21/8173* (2013.01); *H04N 5/76* (2013.01); *H04N 21/643* (2013.01); *H04N 21/6587* (2013.01); *H04N 5/781* (2013.01); *H04N 5/85* (2013.01)

(58) Field of Classification Search
CPC ........... H04N 21/8545; H04N 21/812; H04N 21/4331; H04N 21/235; H04N 21/435; G06Q 30/02
USPC ....................................................... 386/248
See application file for complete search history.

(56) References Cited

U.S. PATENT DOCUMENTS 5,333,135 A    7/1994   Wendorf
5,440,632 A    8/1995   Bacon et al.
(Continued)

FOREIGN PATENT DOCUMENTS

AU    770707 B2    2/2004
CN    1387727    12/2002
(Continued)

OTHER PUBLICATIONS
"U.S. Appl. No. 12/115,598, Final Office Action mailed Jun. 7, 2012", 17 pgs.
(Continued)

*Primary Examiner* — William Tran
(74) *Attorney, Agent, or Firm* — Schwegman Lundberg & Woessner, P.A.

(57) ABSTRACT

A method for playing back a program which includes one or more interactive applications. A program which is stored, either in the form of a data stream or as a set of files is played back from a storage device. When playback is started, applications which are detected are launched. Applications are detected in the playback of pushed content when they become available in the playback stream. Applications are detected in the playback of pulled content by comparing the validity ranges of the applications to a current playback index. When special playback modes are used, signals which affect the lifecycle of an application are detected and corresponding signals are generated to maintain the proper state of the application. During these special playback modes, these various notification signals may be conveyed to applications which are configured to operate during these modes. Applications which are not configured to operate during these special playback modes may be terminated when the special modes are initiated and restarted when the special modes end.

20 Claims, 4 Drawing Sheets

Related U.S. Application Data continuation of application No. 09/663,759, filed on Sep. 15, 2000, now Pat. No. 6,970,641.

(60) Provisional application No. 60/162,624, filed on Oct. 29, 1999.

(51) Int. Cl.
*H04N 5/76* (2006.01)
*H04N 21/643* (2011.01)
*H04N 21/6587* (2011.01)
*H04N 5/781* (2006.01)
*H04N 5/85* (2006.01)

(56) References Cited

U.S. PATENT DOCUMENTS

| | | |
|---|---|---|
| 5,537,141 A | 7/1996 | Harper et al. |
| 5,548,532 A | 8/1996 | Menand et al. |
| 5,563,648 A | 10/1996 | Menand et al. |
| 5,619,250 A | 4/1997 | McClellan et al. |
| 5,625,693 A | 4/1997 | Rohatgi et al. |
| 5,797,001 A | 8/1998 | Augenbraun et al. |
| 5,805,825 A | 9/1998 | Danneels et al. |
| 5,878,222 A | 3/1999 | Harrison |
| 5,895,124 A | 4/1999 | Tsuga et al. |
| 5,903,816 A | 5/1999 | Broadwin et al. |
| 5,923,627 A | 7/1999 | Miwa et al. |
| 5,926,205 A | 7/1999 | Krause |
| 5,926,821 A | 7/1999 | Hirose et al. |
| 5,956,088 A | 9/1999 | Shen et al. |
| 5,973,679 A | 10/1999 | Abbott et al. |
| 5,990,927 A | 11/1999 | Hendricks et al. |
| 5,996,089 A | 11/1999 | Mann |
| 6,002,394 A | 12/1999 | Schein et al. |
| 6,130,726 A | 10/2000 | Darbee et al. |
| 6,157,411 A | 12/2000 | Williams et al. |
| 6,177,930 B1 | 1/2001 | Chernock et al. |
| 6,304,714 B1 | 10/2001 | Krause et al. |
| 6,314,575 B1 | 11/2001 | Billock et al. |
| 6,317,885 B1 | 11/2001 | Fries |
| 6,381,748 B1 | 4/2002 | Lin et al. |
| 6,427,238 B1 | 7/2002 | Goodman et al. |
| 6,442,538 B1 | 8/2002 | Nojima |
| 6,442,598 B1 | 8/2002 | Wright et al. |
| 6,446,204 B1 | 9/2002 | Pang et al. |
| 6,487,723 B1 | 11/2002 | MacInnis |
| 6,496,981 B1 | 12/2002 | Wistendahl et al. |
| 6,530,082 B1 | 3/2003 | Del Sesto et al. |
| 6,718,551 B1 | 4/2004 | Swix et al. |
| 6,757,906 B1 | 6/2004 | Look et al. |
| 6,970,641 B1 | 11/2005 | Pierre et al. |
| 7,069,571 B1 | 6/2006 | Del Sesto et al. |
| 7,386,221 B2 | 6/2008 | Pierre |
| 7,634,787 B1 | 12/2009 | Gebhardt et al. |
| 8,909,027 B2 | 12/2014 | Pierre et al. |
| 2003/0149988 A1 | 8/2003 | Ellis et al. |
| 2006/0026664 A1 | 2/2006 | Pierre et al. |
| 2008/0216112 A1 | 9/2008 | Pierre et al. |

FOREIGN PATENT DOCUMENTS

| | | |
|---|---|---|
| EA | 1234446 A1 | 8/2002 |
| EP | 0299830 A1 | 1/1989 |
| EP | 0399200 B1 | 6/1997 |
| EP | 0949816 A2 | 10/1999 |
| EP | 0752786 B1 | 2/2000 |
| EP | 0913974 B1 | 11/2001 |
| EP | 1234446 A1 | 8/2002 |
| FR | 1234446 A1 | 8/2002 |
| GB | 1234446 A1 | 8/2002 |
| HK | 1050791 A1 | 3/2004 |
| IT | 1234446 A1 | 8/2002 |
| JP | 2003513555 A | 4/2003 |
| WO | WO-9730549 A1 | 8/1997 |
| WO | WO-9741690 A1 | 11/1997 |
| WO | WO-9836559 A1 | 8/1998 |
| WO | WO-0133847 A1 | 5/2001 |

OTHER PUBLICATIONS

"U.S. Appl. No. 12/115,598, Final Office Action mailed Dec. 5, 2013", 16 pgs.

"U.S. Appl. No. 12/115,598, Non Final Office Action mailed Apr. 12, 2013", 14 pgs.

"U.S. Appl. No. 12/115,598, Non Final Office Action mailed Apr. 18, 2014", 20 pgs.

"U.S. Appl. No. 12/115,598, Non Final Office Action mailed Dec. 9, 2011", 15 pgs.

"U.S. Appl. No. 12/115,598, Notice of Allowance mailed Oct. 7, 2014", 14 pgs.

"U.S. Appl. No. 12/115,598, Preliminary Amendment filed May 6, 2008", 3 pgs.

"U.S. Appl. No. 12/115,598, Response filed Mar. 9, 2012 to Non Final Office Action mailed Dec. 9, 2011", 15 pgs.

"U.S. Appl. No. 12/115,598, Response filed Apr. 7, 2014 to Final Office Action mailed Dec. 5, 2013", 14 pgs.

"U.S. Appl. No. 12/115,598, Response filed Sep. 18, 2014 to Non Final Office Action mailed Apr. 18, 2014", 14 pgs.

"U.S. Appl. No. 12/115,598, Response filed Oct. 5, 2012 to Final Office Action mailed Jun. 7, 2012", 13 pgs.

"U.S. Appl. No. 12/115,598, Response filed Oct. 10, 2013 to Non Final Office Action mailed Apr. 12, 2013", 12 pgs.

"International Application Serial No. PCT/US00/40908, International Search Report mailed Feb. 14, 2001", 2 pgs.

"International Application Serial No. PCT/US2000/040908, International Preliminary Examination Report mailed Oct. 30, 2001", 12 pgs.

"International Application Serial No. PCT/US2000/040908, Response filed Oct. 12, 2001 to Written Opinion mailed Aug. 10, 2001", 12 pgs.

"International Application Serial No. PCT/US2000/040908, Written Opinion mailed Aug. 10, 2001", 7 pgs.

"Praxis; Europa-Premiere: Empfänger fur das digitale Fernsehen", Funkschau , Issue 11 with with English translation, (1995), 62-65.

Bach, Uwe, et al., "Excerpts from Magazine Radio-Fernsehen Elektronik", Magazine RadioFernsehen Elektronik. Issue 9 and 10 with English translation, (1996), 28-31 (issue 9); 38-40 (Issue 10).

PLAYBACK OF INTERACTIVE PROGRAMS

CROSS-REFERENCE TO RELATED APPLICATIONS

This application is a continuation of U.S. application Ser. No. 12/115,598, filed May 6, 2008, now U.S. Pat. No. 8,909,027, issued Dec. 9, 2014, which is a continuation of U.S. application Ser. No. 11/205,238, filed Aug. 16, 2005, now U.S. Pat. No. 7,386,221, issued Jun. 10, 2008, which is a continuation of U.S. application Ser. No. 09/663,759, filed Sep. 15, 2000, now U.S. Pat. No. 6,970,641, issued Nov. 29, 2005, which claims the benefit of priority to U.S. Provisional Application No. 60/162,624, filed Oct. 29, 1999.

BACKGROUND OF THE INVENTION

1. Field of the Invention

The invention relates generally to broadcast television systems and more particularly to a system and method for playing back programs which have been stored on the storage device of an interactive television system receiver, wherein the programs contain one or more interactive applications.

2. Description of Related Art

Interactive television systems provide a means to deliver interactive content as well as ordinary television audio and video to a large number of subscribers. Programs broadcast by these systems may incorporate television audio and video, still images, text, interactive graphics and applications, and many other components. The interactive content of the interactive television signal may therefore include application code, data associated with the audio and video, control signals, raw data and many other types of information.

Interactive content such as application code or information relating to television programs is usually broadcast in a repeating format. In other words, each piece of information is broadcast a first time, then each is transmitted a second time, and so on. The cycle is repeated so that each piece of interactive data is transmitted, for example, every ten seconds. The pieces of information which are broadcast in this manner form what is referred to as a "carousel." The sequence of information that makes up the carousel can be prepared in advance, or it can be determined "on the fly."

Broadcast systems (e.g., interactive television systems) transmit information in a carousel format in order to allow receivers in the system to selectively obtain particular pieces of information in the carousel without requiring a return path from the receivers to the server. If a particular receiver needs a particular piece of information, it can simply wait until next time that piece of information is broadcast to obtain the information. If the information were not cyclically broadcast, the receiver would have to transmit a request for the information to the server, thus requiring a return path. Other receivers in the system can operate in the same manner, each receiver waiting for the information it needs, and then using only that information. By employing carousels to broadcast information, the system eliminates the need to connect each of the receivers with the server and further eliminates the need for the server to process individual requests for information. Generally, a broadcast signal may include a number of programs which in turn may include a number of audio/video streams and/or data streams. Data streams may be used to carry data such as interactive application data, subtitle information, or other data.

The pieces of information, or data objects, in a carousel are often intended to be combined to form a single program. This program may also contain streaming data such as audio or video. For example, an interactive television game show may combine television audio and video with interactive content such as application code which allows users to answer questions. Another example would be a news program which combines audio and video with application code that inserts current stock prices in a banner at the bottom of the screen. It is to be understood that the term "program" as used herein refers to any broadcast material including television shows, sporting events, news programs, movies, or any other type of broadcast material, or segment of the show, event, program, movie, or other material. The program may include only audio, video, data, or any combination thereof. The program may be only a portion of a television show or broadcast (e.g., without commercials, or missing a portion of the beginning or end) or may be more than one show, or include commercials, for example.

Program content received in a broadcast system is normally intended to be consumed immediately. It is nevertheless possible to record this content for inter playback. The broadcast information can be recorded "as is" (i.e., as the stream of data transmitted to the receiver,) or it may be recorded as a set of files that can be accessed randomly instead of sequentially. If the information is recorded as a data stream, the data may be referred to as "pushed" data since the receiver must play the information back as a data stream—it cannot retrieve particular data objects out of order. Data objects which are recorded as a set of files can be individually retrieved, and may therefore be referred to as "pulled" data.

Regardless of whether an interactive program is stored as pushed content or pulled content, there may be difficulties in playing back the recorded program, since it was originally intended for immediate consumption. Although it may be a relatively simple matter to play back the entire program from start to finish, just as it was originally provided to a user, the user may wish to use a special mode, such as pausing, fast-forwarding, reversing, or jumping to particular points in the program when it is replayed. Because the program may include different interactive applications which are in various states throughout the program, it is necessary to maintain the proper states for these applications, even when parts of the program are skipped in special playback modes. Further, the applications may interact with other data objects, so in a special playback mode it may be necessary to generate signals that would not otherwise be generated.

SUMMARY OF THE INVENTION

One or more of the problems outlined above may be solved by various embodiments of the invention. One embodiment comprises an interactive television receiver which is coupled to a storage device. The receiver is coupled to a broadcast network and configured to receive a signal corresponding to a program. The signal contains pushed interactive television data. The receiver is configured to store the pushed data, either as pushed content or as pulled content, on the storage device. When the program is played back from the storage device, the receiver is configured to launch applications which are detected in the program. If the program is stored as a stream of data, an application may be detected by receiving an indication that it is available. If the program is stored as a set of files, an application may be detected by comparing the validity range of the application to a current playback index for the program. If special playback modes are used, the receiver is configured to determine whether the program would generate signals during the portion of the program skipped during special mode operations and to generate corresponding notifications if necessary. The receiver may also be configured to terminate and restart applications which are not configured to operate in special playback modes.

One embodiment comprises a method for playing back a program which includes one or more interactive applications. A program is stored, either in the form of a data stream or as a set of files containing the data objects which make up the program. When playback is started, applications which are detected are launched. Applications are detected in the playback of pushed content when they become available in the playback stream. Applications are detected in the playback of pulled content by comparing the validity ranges of the applications to a current playback index. When special playback modes are used, signals which affect the lifecycle of an application are detected and corresponding signals are generated to notify the application to allow it to maintain its proper state. During these special playback modes, these various notification signals may be conveyed to applications which are configured to operate during these modes. Applications which are not configured to operate during these special playback modes may be terminated when the special modes are initiated and restarted when the special modes end.

BRIEF DESCRIPTION OF THE DRAWINGS

Other objects and advantages of the invention will become apparent upon reading the following detailed description and upon reference to the accompanying drawings in which.

Figure 1:
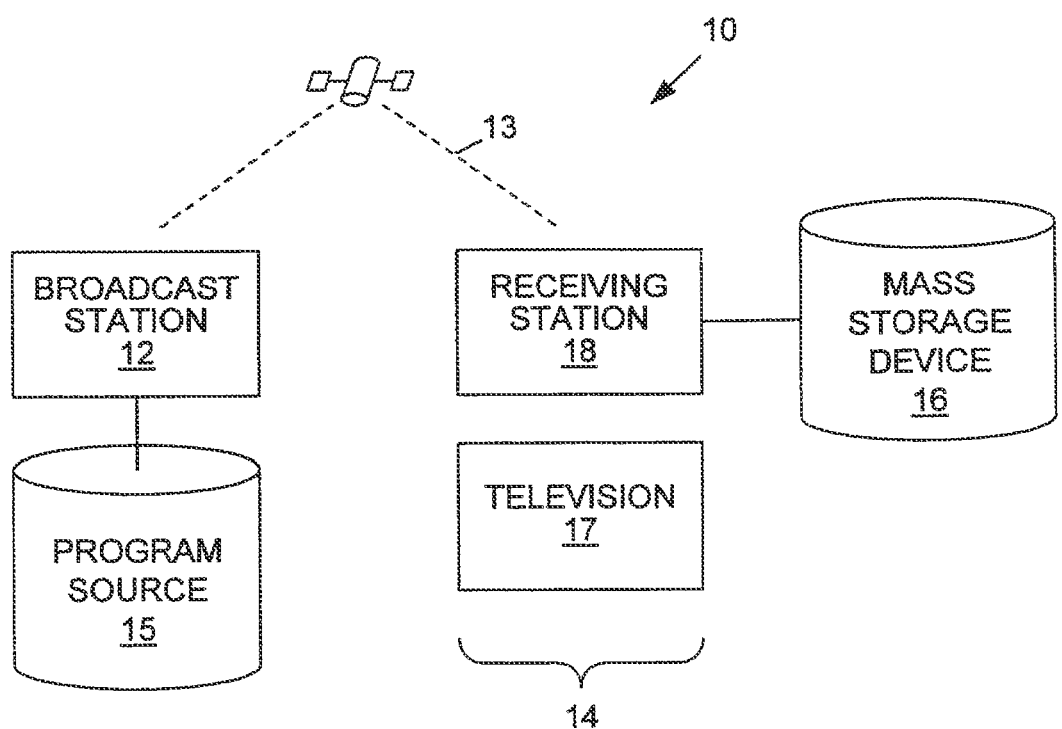
FIG. 1 is a functional block diagram of an interactive television system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Broadly speaking, the invention comprises an improved system and method for replaying stored interactive programs, wherein the programs are originally intended to be consumed as pushed broadcast data. While many embodiments of the invention are possible, the following description focuses primarily on one embodiment which is implemented in an interactive television system. This description is intended to be illustrative rather than limiting.

Referring to FIG. 1, a functional block diagram of an interactive television system 10 is shown. Interactive television system 10 generally comprises a broadcast station 12 and a receiving station 14 coupled to the broadcast station by a broadcast medium 13. In this figure, broadcast medium 13 is depicted as a satellite transmission network. The broadcast medium may, in other embodiments, comprise other transmission means such as cable, telco, MMDS (microwave) and terrestrial transmission media. Broadcast station 12 is coupled to a program source 15 which is configured to provide the data which forms the program. Receiving station 14 includes a receiver 18 which is coupled to a storage device 16. Storage device 16 is configured to store the program data. Receiving station 14 also includes a television 17 which is used to present the program to a user.

In one embodiment, the data objects of a program which is to be broadcast from broadcast station 12 to receiving station 14 are stored in one or more program sources 15. The data objects may be stored separately (e.g., as independently accessible files,) or they may be stored as a preconstructed data stream. It should be noted that the program may also contain streams of data (e.g., audio and video) which are not transmitted as data objects. If the data objects of the program are stored as individual files, they are retrieved by broadcast station 12 from program source 15 to be sequentially broadcast. If the program is stored as a preconstructed data stream, the stream can be broadcast essentially as it is stored. The program data may be compressed and control information may be added to the data for use by the interactive television system. The program data and any additional information is then converted by broadcast station 12 to a format suitable for transmission over broadcast medium 13. In this particular embodiment, the data is formatted into packets which can be transmitted over a digital satellite network. These packets may be multiplexed with other packets for transmission.

Broadcast station 12 transmits the data objects of the program in a carousel which is cyclically transmitted to receiving station 14. This produces a stream of data in which each data object is transmitted repeatedly. It should be noted that the broadcast medium (a digital satellite network in this embodiment) can support a number of different channels, and that different carousels (and corresponding data streams) can be concurrently broadcast on these channels. When receiving station 14 receives the data stream, the program contained in the data stream may be played immediately or it may be recorded. If the program is to be played immediately, receiving station 14 converts the data stream back into the data objects and uses them as necessary in the program. If the program is to be stored, it may be parsed into the individual data objects and stored as a set of files, or it may be stored as a data stream, as it was received. If the program is to be stored, it is conveyed to storage device 16. Data streams which are included in the program (e.g., audio or video streams) may also be stored on storage device 16. The program may be stored whether it is immediately played or not.

Receiver 18 is typically implemented in a set-top box which is connected to television 17. The set-top box incorporates a control unit (e.g., a microprocessor,) a memory, and other components which are necessary to select and decode the received interactive television signals. Because the basic components and features of set-top boxes are known, they will not be discussed in detail here. Typically, set-top boxes are designed to provide the necessary interactive functionality at a minimal cost. Consequently, they normally have a limited amount of memory and no storage devices (e.g., hard disk drives.) While the memory is sufficient to execute interactive applications, it is not adequate to store the applications for an indefinite period of time. Therefore, the applications do not normally remain in memory when they are no longer being executed.

Even if the memory of the set-top box were large enough to store some interactive applications, it might still be too small to accommodate a program which includes large amounts of audio or video data, application code, or other information. In one embodiment of the present system, storage device 16 is coupled to the set-top box to provide sufficient storage to record programs that will not fit in the limited amount of memory in the set-top box. Storage device 16 may comprise any suitable storage device, such as a hard disk drive, a recordable DVD drive or optical disk drive. It can be internal to the set-top box, or it may be connected externally. Storage device 16 can be connected permanently or removably to the set-top box.

Figure 2:
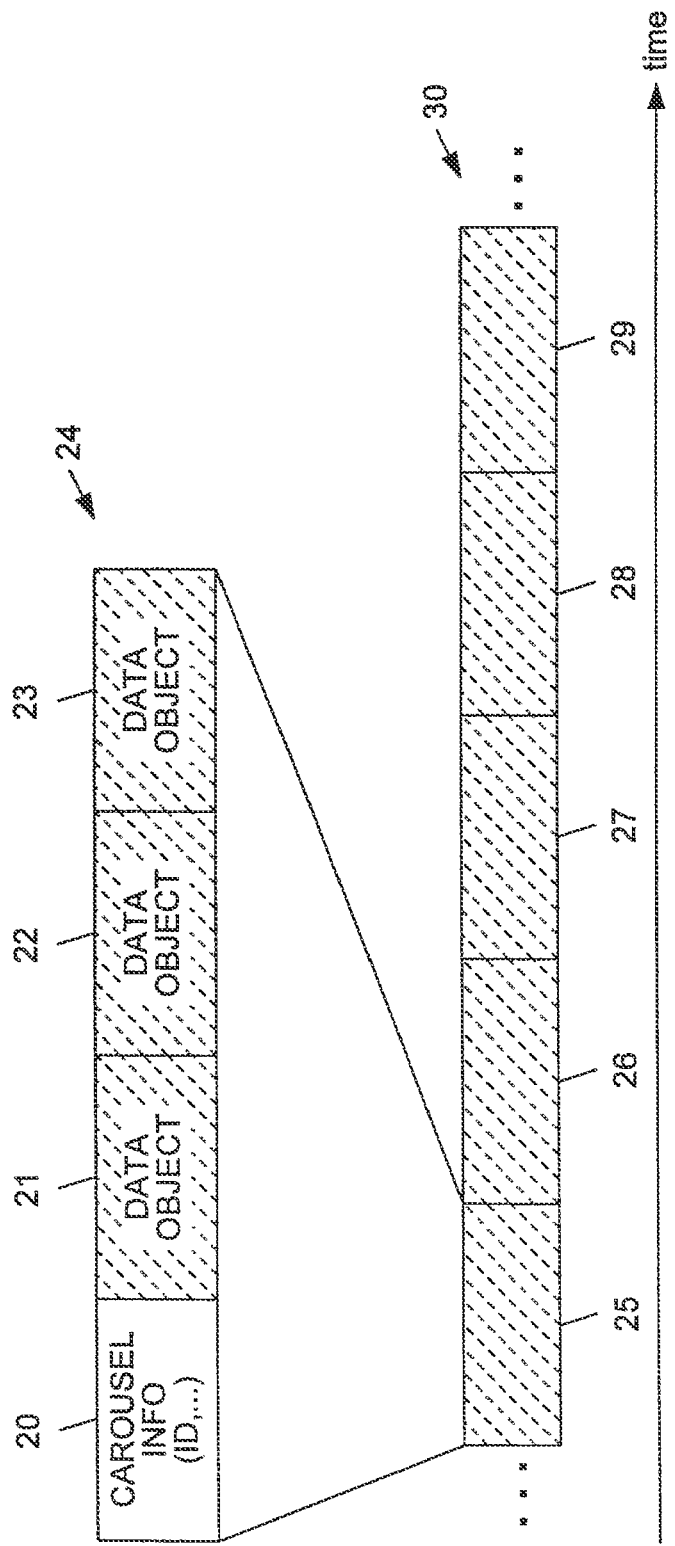
FIG. 2 is a diagram illustrating the structure or a carousel and a corresponding data stream.
Figure 3:
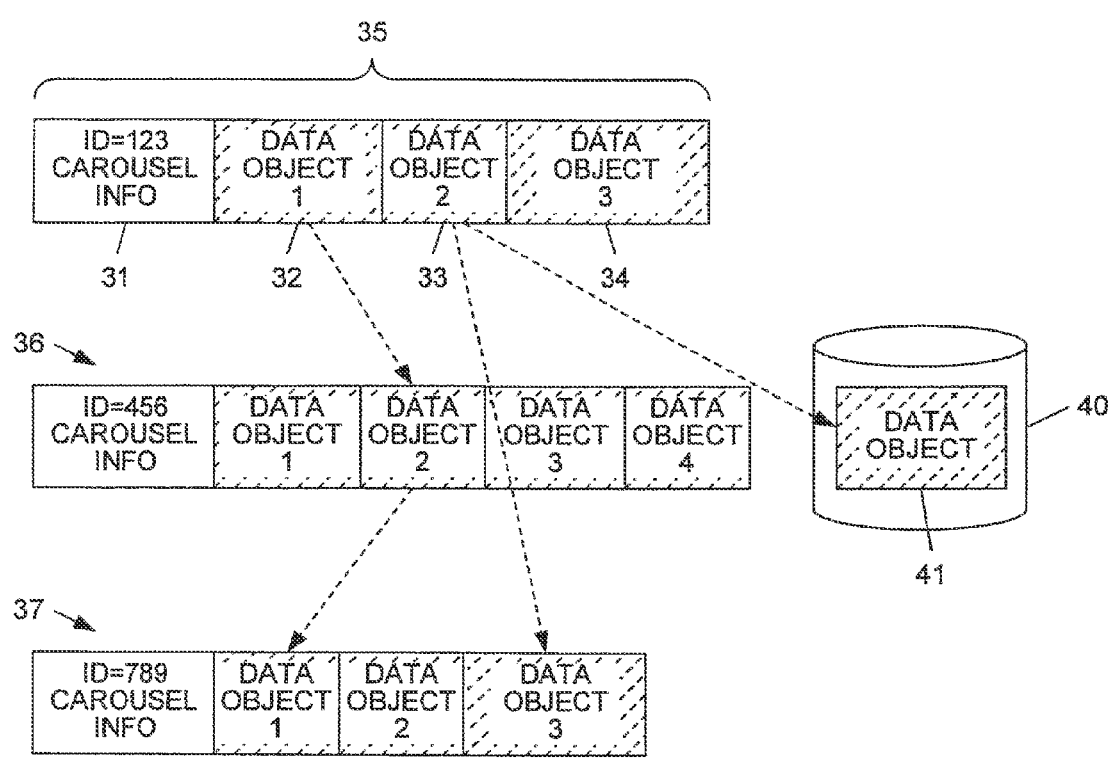
FIG. 3 is a diagram illustrating the interrelation of data objects in one program.

Referring to FIG. 2, the structure of a carousel (and a corresponding data stream) which is transmitted to the receiver is illustrated. Carousel 24 comprises data objects 21-23 and carousel information 20. Data objects 21-23 are retrieved from a program source as described above. Carousel information 20 is provided by the broadcast station and may contain information such as the carousel ID and version number, a file access table or directory for the carousel, and various other information. (Portions of this information, such as the file access table, are not necessary in programs which are intended for immediate consumption.) The broadcast station transmits carousel information 20 and data objects 21-23 sequentially. The first instance of the transmission of carousel 24 is indicated by 25. After the broadcast station has completed transmission of the first instance of carousel 24, it is transmitted again, as indicated by 26. The successive, cyclical transmissions of carousel 24 indicated by 25-29 form data stream 30. Transmission of the carousel may be repeated indefinitely.

As mentioned above, the data objects which comprise a program may include application code, audio and video data, control signals, raw data and other types of information. If the program is to be immediately consumed (i.e., presented to the user,) the data must be parsed to extract the data objects from the stream. When the necessary data objects have been extracted, the program is played. The data objects are used as defined in the program. For example, any applications which need to be executed are launched, any audio or video data which needs to be presented to the user is played or displayed, any signals which need to be produced are generated, and so on. The program is presented to the user, typically via a television 17, and is consumed. Regardless of whether or not the program is immediately presented to the user, it can also be stored. The storage device can be used to store programs "as is" (i.e., as a data stream which is essentially the same as that received in the broadcast signal) or as a set of files that can be individually accessed or updated. In either case, the recorded program can be played back. The present system and method are employed to facilitate and/or enable the use of playback features such as trick play modes when viewing the recorded program. To illustrate the advantages of the system and method, it may be useful to examine the structure of a program.

As noted above, a program may consist of a number of data objects and data streams. These data objects may reference each other, they may trigger certain events, or they may be triggered by certain events. Interactive applications which are contained in the program may be started and stopped while the program is being played. If the data objects are stored as files, the validity ranges associated with the files correspond to the times during which they are available to the program. For example, as long as a data object is being broadcast as part of a carousel, that data object is valid. When the carousel (hence the data object) is no longer being broadcast, the data object is no longer valid. Thus, a start time and an end time defining the validity range of the data object can be determined by the receiver and stored with the corresponding file. It should be noted that, although the present disclosure is directed primarily to an interactive television system which is configured to play back a previously stored broadcast program, the system and method presented herein are equally applicable to the playback of programs which are stored by other means. For example, pushed content which could be broadcast may also be stored offline (e.g., on a DVD) and later distributed to the user for playback. The program could also be played back from an on-demand server (e.g., playing video on demand.)

Figure 4:
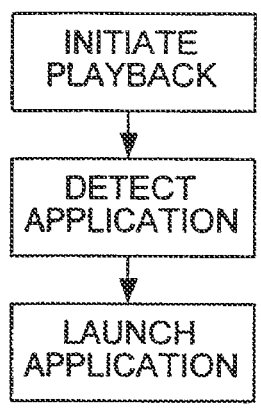
FIG. 4 is a flow diagram illustrating one embodiment of the present method.

Referring to FIG. 4, a flow diagram illustrating one method employed by the interactive television system described above is shown. After the program is recorded on the storage device, playback of the program is initiated. The receiver is configured to detect applications in the recorded data. When an application is detected in the program, the application is launched. The manner in which applications are detected in the program depends upon how the program was stored.

Figure 5:
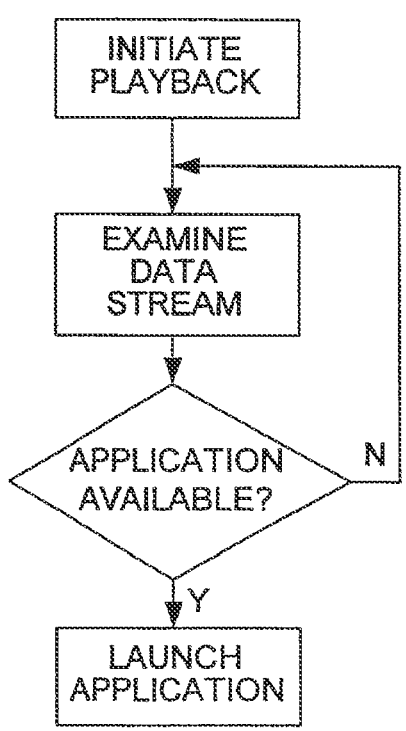
FIG. 5 is a flow diagram illustrating an embodiment of the present method in which a program has been stored in a data stream.

Referring to FIG. 5, a flow diagram illustrating the detection of an application in a system configured to receive a program as a data stream is shown. If the application was recorded as a data stream, the receiver detects an application by examining the sequential stream of data which is played back from the storage device. When the stream contains information indicating that the application is available, the receiver detects this information and thereby detects the application. The application is then launched.

Figure 6:
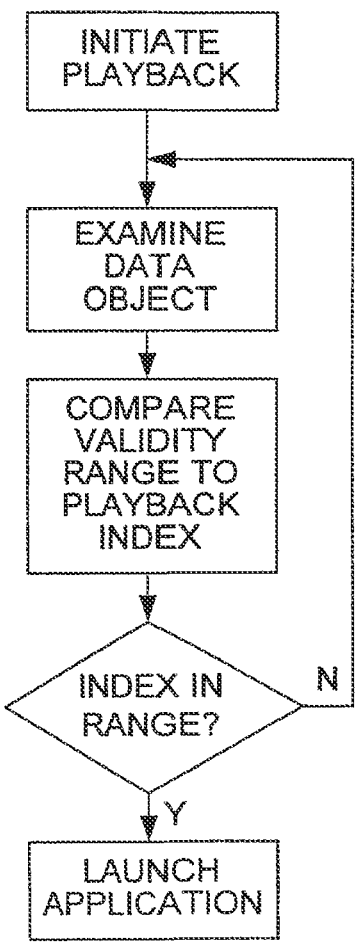
FIG. 6 is a flow diagram illustrating an embodiment of the present method in which a program has been stored as a set of files.

Referring to FIG. 6, a flow diagram illustrating the detection of an application in a system configured to receive a program as a set of files is shown. If the program was recorded as a set of files, the detection of applications in the program proceeds in a different manner. When playback of the program is initiated, the receiver examines the stored files. In one embodiment, the application files include information defining validity ranges for the corresponding applications. The receiver compares the validity range for each application to a current playback index. If the current playback index falls within the validity range of a particular application, that application is considered to have been detected, and is launched.

The current playback index mentioned above is simply a relative time index used in the playback of the program. The validity ranges mentioned above comprise data which, in one embodiment, is determined by the receiver when the program is recorded. (It should be noted that in some embodiments, particularly those in which the program is played back from a prerecorded medium such as a DVD, the validity range may be predetermined and provided with the corresponding data object) The validity range consists of a beginning time and an end time. The application is intended to be executed (or to be available for execution) between the beginning and end times. Thus, if playback of a program is initiated and the current playback index is within the validity range of an application, the receiver will launch the application.

This may be illustrated in the following example. Assume a program is broadcast from 1:00 to 2:00. The program contains an application which is valid during the entire program. If a user records the program from 1.30 to 2:30, the application is stored with a validity range from 1:30 to 2:00, or 30 minutes from the beginning of the recording. When the program is played back, the application will be valid for the first 30 minutes of the recording. If the user starts playback of the program and fast-forwards for 40 minutes, when normal playback is resumed, the application will no longer be valid and will not be restarted.

Whether the program was stored as a data stream or as a set of files, the detection of applications continues as the program is played back. Thus, as new applications are detected, they are launched. It should be noted that the capabilities of the receiver and the policies implemented in the execution environment of the receiver determine the effect on a currently executing application of launching another application. If the receiver is capable of executing only one application at a time, a currently executing application may have to be killed or suspended before another application can be launched. It may or may not be necessary to unload the first application from memory while the second application is executing. If the receiver can simultaneously execute more than one application, then the second application may be launched while the first application continues to run. The receiver may, however, implement a policy which prohibits executing applications simultaneously. The receiver may therefore be required to kill or suspend the first application upon launching the second, even though the receiver is capable of executing both.

As mentioned above, when a user plays back a program, he or she may wish to use special playback modes rather than simply playing the program back sequentially (i.e., in a normal play mode.) The special modes may include trick play modes, such as fast forward, slow motion and rewind, and may also include jump, seek and pause features. When special play modes are used, the program moves from a first point at which an application is in a first state (e.g., executing) to a second point at which the application should be in a second state (e.g., terminated or suspended.) Because the portion of the program between the first and second points is not played (or executed,) certain signals and events which would normally cause an application to modify its state are not encountered. Care must therefore be taken to ensure that the lifecycle of the application resulting from use of the special play mode corresponds to the position in the program after the special play mode is stopped. ("Lifecycle" is used here to indicate the state of the application, including but not limited to states of execution, such as launch, suspend, resume and terminate, and any internal states defined by the application during execution.)

Because the application may skip an event (a signal or set of conditions) which should trigger a change of state in the application, it may be necessary to take some action to produce the change of state. In one embodiment, the receiver is configured to determine whether any events would occur between initiation of the special play mode and termination of the special play mode which would affect the lifecycle of the application. These events may include the receipt of particular signals or notifications, the existence of particular conditions, or other factors. The receiver is configured to generate signals or notifications corresponding to the skipped events, and to convey these signals or notifications to the application to modify its state. These signals and notifications may include kill signals, notifications that special play modes have been started or stopped, notifications that seeks have been initiated, module or trigger notifications, accelerated version notifications, and other signals or notifications that may be useful in playing back the program. It should be noted that the generation of signals to and notifications may be dependent upon the existence of related conditions. For example, modules and triggers may be flagged to indicate whether notifications relating thereto should be provided to the applications. Generation of signals and notifications may also be conditioned upon whether they occur within a corresponding validity range.

The receiver is also configured to generate signals associated with application chaining and to provide the signals to applications in the program. "Chaining" refers to the execution of different applications in the program in relation to each other. The chaining policy defines how execution of certain applications affects other applications. For example, if a first application is currently executing and a second application is detected and launched, the chaining policy may define whether the first application is terminated or suspended or, if the receiver can concurrently execute both applications, whether they should both be executed at the same time. It should be noted that the capabilities of the receiver may affect the chaining policy, since the policy is implemented in the receiver. (For example, if the receiver can only execute one application at time the chaining policy cannot have two applications executing concurrently.)

The signals provided by the receiver to the applications are typically generated sequentially (in the order they would have occurred in a normal playback mode) because the state of an application may depend on the order in which the signals are received. When the special play mode is a forward mode (e.g., fast forward,) the signals and notifications generated by the receiver are provided to the applications in their normal sequential order. When the special play mode is a reverse mode (e.g., rewind,) the signals may have to be generated in reverse order, or the receiver may have to generate signals which "undo," or reverse the effect of, the forward-play signals.

It should be pointed out that some applications may depend on live data reception to maintain, their state. When a special playback mode is used to cause an application to move to a particular point in the playback of the program, precautions may need to be taken to ensure that the application is in the appropriate state after the program returns to a normal playback mode. This needs to be addressed for two different cases: cases in which applications were authored with the intent that they would be recorded and played back; and cases in which applications were not intended to the recorded and replayed.

In the first case, an application is produced with the knowledge that it maybe recorded and played back using special play modes. Such an application would typically be designed to accept notifications of these special play modes and to accommodate them. For example, an application can be configured to generate a query to determine the current position in the playback of the program. The application could then set its internal state according to the position in the program.

In the second case, an application is produced with the intent that it will be consumed as it is received. The application is not designed to jump from one position to another in the program except as the program progresses in a normal play mode. If a special play mode is initiated while such an application is executing, the application can simply be terminated and restarted at the new position in the program. The application may be allowed to save information (e.g., state information) to persistent storage such as the storage device when it is terminated. It should be noted that the application may be removed from memory when it is terminated, so it may have to be downloaded again from the data stream and restarted after the program has jumped to the new position.

Because these two types of applications are handled differently when special play modes are initiated, it is contemplated that the applications will be configured to indicate to the receiver whether they are capable of handling special play modes. It is also contemplated that some applications may be configured to prevent certain special play modes. For example, an application may be configured to prevent the user from rewinding or may allow the user to rewind only to certain positions, such as the beginnings of chapters.

While the present invention has been described with reference to particular embodiments, it will be understood that the embodiments are illustrative and that the invention scope is not limited to these embodiments. Many variations, modifications, additions and improvements to the embodiments described are possible. These variations, modifications, additions and improvements may fall within the scope of the invention as detailed within the following claims.

What is claimed is:

1. A method comprising:
    initiating playback of a media item containing one or more interactive applications from a storage device;
    launching and executing a first interactive application of said one or more interactive applications based on a detecting of said first interactive application during said playback of said media item;
    initiating a special play mode of said media item based on a user command;
    receiving, from said first interactive application, a query to determine a current playback position of said media item;
    determining at least one event skipped during said initiated special play mode that would result in a change of a state of said first interactive application, the determining of the at least one skipped event comprising determining the current playback position of said media items; and
    conveying at least one notification signal of said at least one skipped event to said first interactive application to modify said state of said first interactive application based on said determining of said at least one skipped event, the conveying of the at least on notification signal comprising returning, to said first interactive application in response to the query, an indication of the current playback position of said media item, and at a time at which said special play mode is terminated, said modified state of said first interactive application corresponds to a position in said media item at which said special play mode is terminated.

2. The method of claim 1 wherein said media item is stored on said storage device as it is received, wherein the detecting of said first interactive application comprises detecting said first interactive application is available from an interactive application data stream of said program during said playback.

3. The method of claim 1 further comprising storing said media item, wherein storing said media item includes storing an interactive application data stream of said media item, wherein said storing of said data stream comprises extracting from said media item one or more data objects and storing said data objects on said storage device as a set of files, wherein initiating playback of said data stream comprises retrieving one or more of said set of files from said storage device and wherein detecting said one of said one or more interactive applications comprises comparing a validity range associated with said one of said one or more applications to a current playback index and determining that said current playback index is within said validity range.

4. A method comprising:
    providing a media item stored on a storage device, said media item comprising an interactive application;
    initiating playback of said media item from said storage device;
    launching said interactive application;
    initiating a special play mode of said media item in response to a user command;
    receiving, from said interactive application, a query to determine a current playback position of said media item;
    determining an event skipped during said special play mode, the determining of the event skipped during said special play mode comprising determining the current playback position of said media item; and
    conveying a notification signal to said interactive application during said special play mode based on said determining of the event skipped during said special play mode, the conveying of the notification signal comprising returning, to said interactive application in response to the query, an indication of the current playback position of said media item, and, at a time at which said special play mode is terminated, a state of said interactive application corresponds to a position in said media item at which said special play mode is terminated.

5. The method of claim 4 further comprising:
    determining, in response to the current playback position changing from a first value to a second value during said special play mode, whether events affecting the state of said interactive application would have been encountered in a normal play mode between said first value and said second value;
    generating signals corresponding to said events; and
    conveying said signals to said interactive application.

6. The method of claim 5 wherein said signals are generated sequentially according to the order of said corresponding events in a normal play mode.

7. The method of claim 4 wherein notification signal is selected from the group consisting of: application kill signals; application launch signals; application pause signals; application resume signals; trick mode start notifications; trick mode end notifications; seek notifications; module notifications; trigger notifications; and accelerated version notifications.

8. The method of claim 4 further comprising said interactive application receiving an indication of a current position in said media item and setting the internal state of said interactive application to correspond to said current position.

9. The method of claim 8 wherein said application receives said indication of said current position in said media item while said media item is in said special play mode.

10. The method of claim 4 further comprising:
    conveying a kill signal to said interactive application in said media item during said special play mode;

terminating said special play mode; and
launching an interactive application in response to detecting said interactive application is available.

11. The method of claim 4 further comprising said interactive application:
indicating to a receiver on which said interactive application is executing whether said interactive application is configured to operate when a special play mode is initiated;
notifying said interactive application of said special play mode in response to detecting said interactive application is configured to operate during said special play mode; and
terminating said interactive application when said special play mode is used in response to detecting said interactive application is not configured to operate during said special play mode.

12. The method of claim 4 further comprising:
receiving said media item; and
storing said media item on said storage device.

13. A device comprising:
a receiver; and
a storage device coupled to said receiver, said storage device being configured to store a media item data stream including one or more interactive application data streams and to provide said media item data stream to said receiver for playback,
said receiver being configured to:
initiate playback of said media item data stream;
launch and execute said one or more interactive applications based on a detecting of said one or more interactive applications during playback of said media item data stream;
initiate a special play mode of said media item data stream based on a user command;
receive, from said one or more interactive applications, a query to determine a current playback position of said media item data stream;
determine at least one event skipped during said initiated special play mode that would result in a change of state of said one or more interactive applications, the determining of the at least one skipped event comprising determining the current playback position of said media item data stream; and
convey a notification signal of said at least one skipped event to said one or more interactive applications based on said determining of said at least one skipped event, the conveying of the notification signal comprising returning, to said one or more interactive applications in response to the query, an indication of the current playback position of said media item data stream, and, at a time at which said special play mode is terminated, said state of said one or more interactive applications corresponds to a position in said media item data stream at which said special play mode is terminated.

14. The device of claim 13 wherein said receiver is configured to be coupled to an interactive television system; wherein said receiver is configured to receive said media item data from said interactive television system, and wherein said receiver is configured to store said media item data in said storage device.

15. The device of claim 13 wherein said storage device is configured to store said media item data stream as it is received, wherein said receiver is configured to receive said media item data stream and to determine when said one or more interactive applications are available in said media item data stream, and wherein said receiver is configured to launch said one or more interactive applications, in response to detecting said one or more interactive applications are available.

16. The device of claim 13 wherein said storage device is configured to store said media item data stream as a set of files, wherein said receiver is configured to retrieve one of said set of files containing interactive applications, wherein said receiver is configured to compare validity ranges associated with said interactive applications to a current playback index, and wherein said receiver is configured to launch ones of said interactive applications for which said associated validity range includes said current playback index.

17. The device of claim 13 wherein said special play mode comprises a fast-forward mode or a rewind mode.

18. The device of claim 13 wherein said receiver is configured to receive a notification from a first interactive application of said one or more interactive applications indicating whether said first interactive application is configured to operate in special playback modes; wherein if said first interactive application is configured to operate in special playback modes, said receiver is configured to provide a notification of said special playback mode to said first interactive application when said special playback mode is used; and wherein if said first interactive application is not configured to operate in special playback modes, said receiver is configured to terminate said first interactive application when said special playback mode is used.

19. The device of claim 18 wherein when use of said special playback mode is stopped, said receiver is configured to restart said first interactive application.

20. The device of claim 19 wherein said receiver is configured to restart said first interactive application by extracting said first interactive application from a data stream.

* * * * *